United States Patent [19]

Tsuruta et al.

[11] Patent Number: 5,307,158
[45] Date of Patent: Apr. 26, 1994

[54] VIDEO CAMERA

[75] Inventors: Masaaki Tsuruta; Ryuji Shiono; Minoru Morio, all of Tokyo, Japan

[73] Assignee: Sony Corporation, Tokyo, Japan

[21] Appl. No.: 26,655

[22] Filed: Mar. 5, 1993

[30] Foreign Application Priority Data

Mar. 31, 1992 [JP] Japan .................. 4-108815

[51] Int. Cl.[5] .......................... H04N 9/04; H04N 9/07
[52] U.S. Cl. ..................... 348/265; 348/229; 348/312
[58] Field of Search ............ 358/44, 43, 41, 50, 358/52, 211, 213.13, 213.19, 213.26, 209, 909, 226; H04N 9/04, 9/07, 9/077, 9/09, 9/097, 5/335/5/225/5/235

[56] References Cited

U.S. PATENT DOCUMENTS 4,599,640 7/1986 Dischert ...................... 358/50
4,614,966 9/1986 Yunoki et al. .................. 358/44

FOREIGN PATENT DOCUMENTS 62-85583 9/1987 Japan ............ H04N 5/225
0117578 5/1989 Japan ............ H04N 5/225
3286686 3/1992 Japan ............ H04N 5/335

Primary Examiner—James J. Groody
Assistant Examiner—Michael H. Lee
Attorney, Agent, or Firm—Lewis H. Eslinger; Jay H. Maioli

[57] ABSTRACT

A plurality of CCD image pickup devices are provided. When the multiplex exposure is executed, the exposure timings of the plurality of image pickup devices are set to different timings. The output signals of the plurality of image pickup devices of different timings are synchronized and synthesized, thereby forming a multiplexed signal.

5 Claims, 4 Drawing Sheets

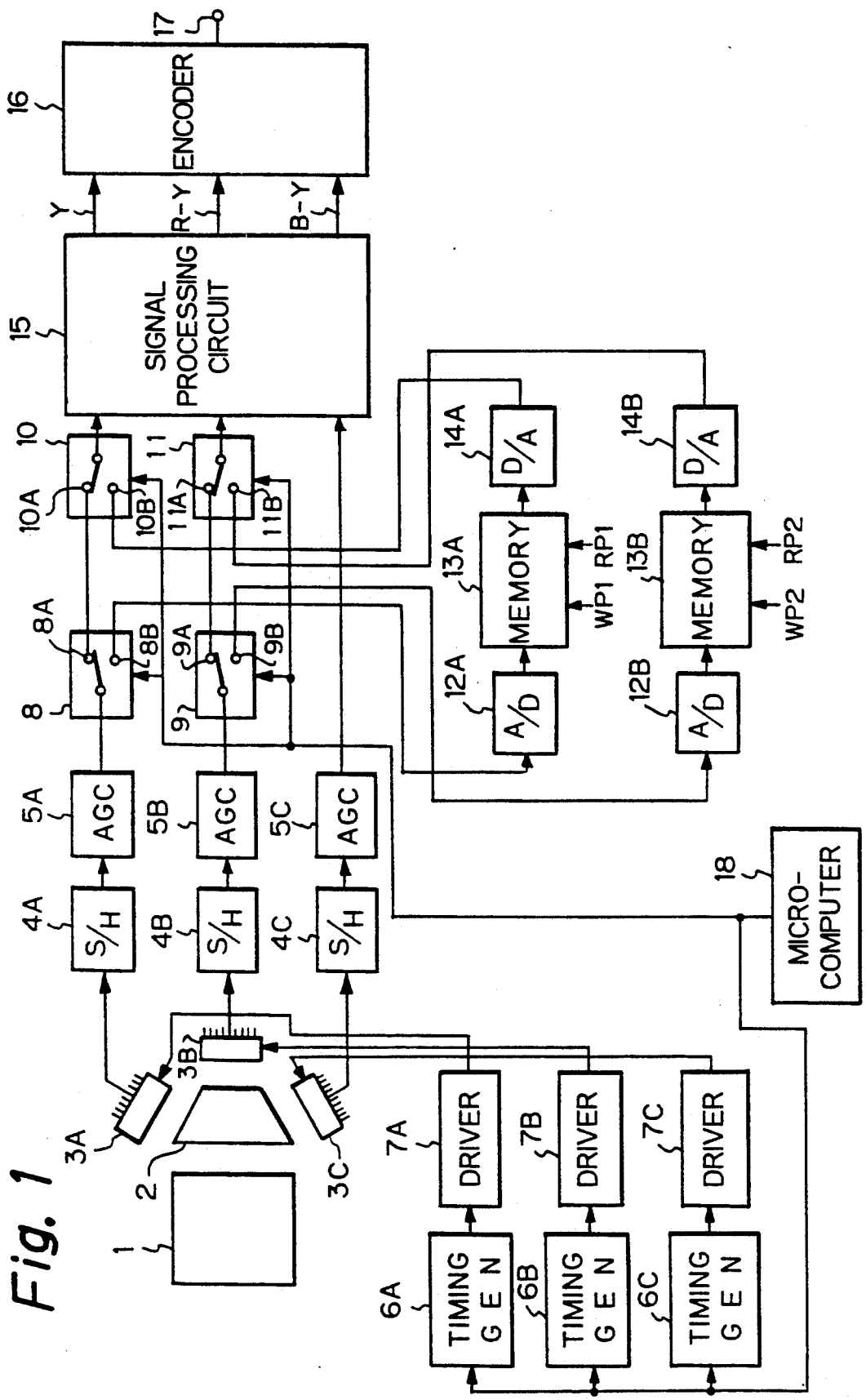

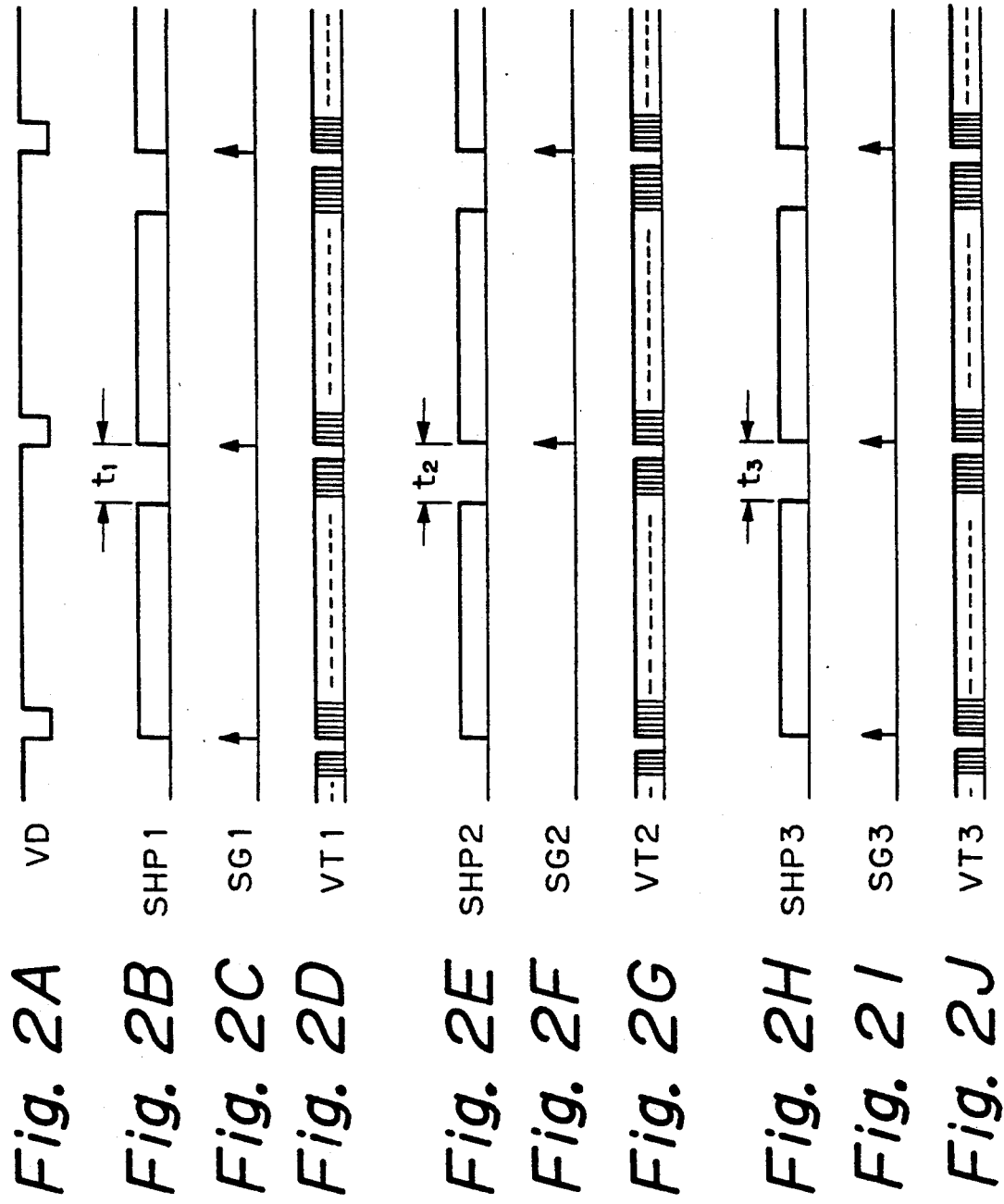

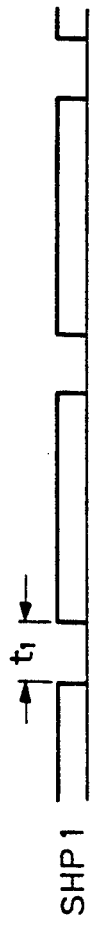
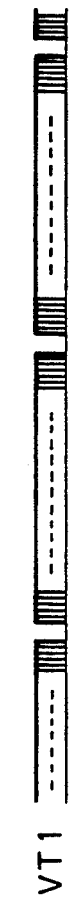
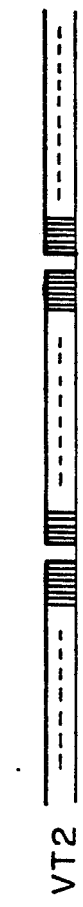
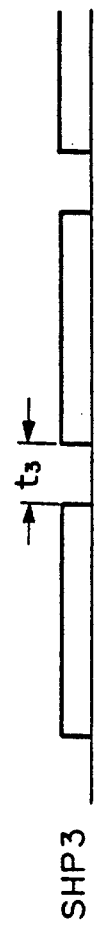
Fig. 3A  VD
Fig. 3B  SHP1
Fig. 3C  SG1
Fig. 3D  VT1
Fig. 3E  SHP2
Fig. 3F  SG2
Fig. 3G  VT2
Fig. 3H  SHP3
Fig. 3I  SG3
Fig. 3J  VT3

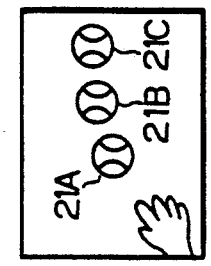
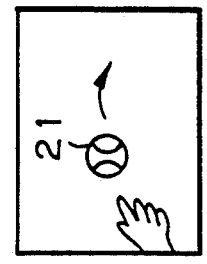
Fig. 4A VD
Fig. 4B WP1
Fig. 4C RP1
Fig. 4D WP2
Fig. 4E RP2
Fig. 5
Fig. 6

VIDEO CAMERA

BACKGROUND OF THE INVENTION

1. Field of the Invention

The present invention relates to a video camera for multiplexing picture planes of a plurality of fields and displaying a multiplexed image.

2. Description of the Prior Art

In a camera integrated type VTR, a VTR having a multiplex exposing function for multiplexing picture planes of a plurality of fields and displaying a multiplexed image has been put into practical use. In almost of the conventional VTRs of the camera integrated type, an image pickup device of the single plate type is used. In case of the single plate type, the image pickup device operates at timings such that when one field is exposed, the other field transfers a signal. Therefore, a multiplex exposure is realized by an interpolating process by using a field memory.

In a video camera using the conventional image pickup device of the single plate type, there are problems such that since output images are intermittently obtained every field, when the multiplex exposure is performed, it is necessary to execute the interpolating process by using the field memory and only one image information is obtained every two fields, and in a field in which the image information lacks, the image of the field just before such a field must be repetitively read out from the field memory.

OBJECTS AND SUMMARY OF THE INVENTION

It is, therefore, an object of the present invention to provide a video camera in which when the multiplex exposure is executed, image information is obtained every field and an interpolating process is unnecessary.

According to an aspect of the present invention, there is provided a video camera comprising:

a plurality of image pickup devices which can simultaneously receive an object image light;

timing setting means for setting exposure timing of the plurality of image pickup devices; and a signal processing circuit to form a multiplexed exposure signal from outputs of the plurality of image pickup devices, wherein in a multiplex exposure photographing mode, the exposure timings of the plurality of image pickup devices are set so as to be different, the outputs of the plurality of image pickup devices are set to signals synchronized with each other, and a multiplexed exposure signal is formed by synthesizing the synchronized signals.

The above, and other, objects, features and advantage of the present invention will become readily apparent from the following detailed description thereof which is to be read in connection with the accompanying drawings.

BRIEF DESCRIPTION OF THE DRAWINGS

FIG. 1 is a block diagram of an embodiment of the present invention;

FIGS. 2A to 2J are timing diagrams in a timing chart which is used to explain the embodiment of the invention;

FIGS. 3A to 3J are timing diagrams in a timing chart which is used to explain the embodiment of the invention;

FIGS. 4A to 4E are timing diagrams in a timing chart which is used to explain the embodiment of the invention;

FIG. 5 is a schematic diagram which is used to explain the embodiment of the invention; and FIG. 6 is a schematic diagram which is used to explain the embodiment of the invention.

DETAILED DESCRIPTION OF THE PREFERRED EMBODIMENTS

An embodiment of the present invention will be described hereinbelow with reference to the drawings. FIG. 1 shows the embodiment of the invention. In FIG. 1, an object image light transmitted through a lens 1 is separated into lights of three primary colors of R, G, and B through a prism 2 and formed as images on light receiving surfaces of CCD image pickup devices 3A, 3B, and 3C, respectively.

A shutter pulse, a sensor gate pulse, a transfer pulse, and the like are supplied from a timing generating circuit 6A to the CCD image pickup device 3A through a driver 7A. A shutter pulse, a sensor gate pulse, a transfer pulse, and the like are supplied from a timing generating circuit 6B to the CCD image pickup device 3B through a driver 7B. A shutter pulse, a sensor gate pulse, a transfer pulse, and the like are supplied from a timing generating circuit 6C to the CCD image pickup device 3C through a driver 7C.

Output signals of the CCD image pickup devices 3A, 3B, and 3C are transmitted through sample and hold circuits (S/H circuits) 4A, 4B, and 4C and AGC circuits 5A, 5B, and 5C, respectively. An output signal of the AGC circuit 5A is supplied to a switching circuit 8. An output signal of the AGC circuit 5B is supplied to a switching circuit 9.

An output signal of a terminal 8A of the switching circuit 8 is supplied to a terminal 10A of a switching circuit 10. An output signal of a terminal 8B of the switching circuit 8 is supplied to an A/D converter 12A. An output signal of the A/D converter 12A is supplied to a field memory 13A.

A write pulse WP1 and a read pulse RP1 are supplied to the field memory 13A. An output signal of the field memory 13A is supplied to a D/A converter 14A. An output signal of the D/A converter 14A is supplied to a terminal 10B of the switching circuit 10.

An output signal of a terminal 9A of the switching circuit 9 is supplied to a terminal 11A of a switching circuit 11. An output signal of a terminal 9B of the switching circuit 9 is supplied to an A/D converter 12B. An output signal of the D/A converter 12B is supplied to a field memory 13B.

A write pulse WP2 and a read pulse RP2 are supplied to the field memory 13B. An output signal of the field memory 13B is supplied to a D/A converter 14B. An output signal of the D/A converter 14B is supplied to a terminal 11B of the switching circuit 11.

Output signals of the switching circuits 10 and 11 are supplied to a signal processing circuit 15. An output signal of the AGC circuit 5C is supplied to the signal processing circuit 15. A luminance signal Y and color difference signals R-Y and B-Y are formed by the signal processing circuit 15. The luminance signal Y and the color difference signals R-Y and B-Y are supplied to an encoder 16. For instance, a video signal of the NTSC system is formed by the encoder 16. The video signal is generated from an output terminal 17.

A microcomputer 18 supplies a serial signal to the timing generating circuits 6A, 6B, and 6C and the switching circuits 8, 9, 10, and 11 and executes a switching process to switch a normal photographing mode and a multiplex exposing mode.

In the normal photographing mode, the switching circuits 8 and 9 are set to the terminals 8A and 9A, respectively. The switching circuits 10 and 11 are set to the terminals 10A and 11A, respectively.

As shown in FIGS. 2A to 2J, the CCD image pickup devices 3A, 3B, and 3C are set to the same exposure timing. FIG. 2 shows timings for the electronic shutter pulses, sensor gate pulses, and vertical transfer pulses which are given to the CCD image pickup devices 3A to 3C in case of the normal photographing mode.

FIG. 2A shows a vertical pulse VD. FIG. 2B shows a shutter pulse SHP1 which is given to the CCD image pickup device 3A in the normal photographing mode. FIG. 2C shows a sensor gate pulse SG1 which is given to the CCD image pickup device 3A in the normal photographing mode. FIG. 2D shows a vertical transfer pulse VT1 which is given to the CCD image pickup device 3A in the normal photographing mode.

FIG. 2E shows a shutter pulse SHP2 which is given to the CCD image pickup device 3B in the normal photographing mode. FIG. 2F shows a sensor gate pulse SG2 which is given to the CCD image pickup device 3B in the normal photographing mode. FIG. 2G shows a vertical transfer pulse VT2 which is given to the CCD image pickup device 3B in the normal photographing mode.

FIG. 2H shows a shutter pulse SHP3 which is given to the CCD image pickup device 3C in the normal photographing mode. FIG. 2I shows a sensor gate pulse SG3 which is given to the CCD image pickup device 3C in the normal photographing mode. FIG. 2J shows a vertical transfer pulse VT3 which is given to the CCD image pickup device 3C in the normal photographing mode.

As shown in FIGS. 2A to 2J, in the normal photographing mode, timings of the CCD image pickup devices 3A to 3C are set synchronously with the vertical sync pulse VD. Exposure timings $t_1$, $t_2$, and $t_3$ of the CCD image pickup devices 3A to 3C are set to the same timing.

In the multiplex exposing mode, the switching circuits 8 and 9 are set to the terminals 8B and 9B and the switching circuits 10 and 11 are set to the terminals 10B and 11B, respectively. The exposure timings of the three CCD image pickup devices 3A, 3B, and 3C are set to different timings.

That is, FIGS. 3A to 3J shows timings for the electronic shutter pulses, sensor gate pulses, and vertical transfer pulses which are given to the CCD image pickup devices 3A to 3C in the multiplex exposing mode.

FIG. 3A shows the vertical sync pulse VD. FIG. 3B shows the shutter pulse SHP1 which is given to the CCD image pickup device 3A in the multiplex exposing mode. FIG. 3C shows the sensor gate pulse SG1 which is given to the CCD image pickup device 3A in the multiplex exposing mode. FIG. 3D shows the vertical transfer pulse VT1 which is given to the CCD image pickup device 3A in the multiplex exposing mode.

FIG. 3E shows the shutter pulse SHP2 which is given to the CCD image pickup device 3B in the multiplex exposing mode. FIG. 3F shows the sensor gate pulse SG2 which is given to the CCD image pickup device 3B in the multiplex exposing mode. FIG. 3G shows the vertical transfer pulse VT2 which is given to the CCD image pickup device 3B in the multiplex exposing mode.

FIG. 3H shows the shutter pulse SHP3 which is given to the CCD image pickup device 3C in the multiplex exposing mode. FIG. 3I shows the sensor gate pulse SG3 which is given to the CCD image pickup device 3C in the multiplex exposing mode. FIG. 3J shows the vertical transfer pulse VT3 which is given to the CCD image pickup device 3C in the multiplex exposing mode.

As shown in FIGS. 3A to 3J, in case of the multiplex exposing mode, the exposure timings $t_1$, $t_2$, and $t_3$ of the CCD image pickup devices 3A to 3C are set to be different. The exposure timing of the CCD image pickup device 3C is synchronized with the vertical sync pulse.

The field memories 13A and 13B are provided to multiplex the image pickup signals which were exposed at the different timings as mentioned above. FIGS. 4A to 4E shows timings for write pulses and read pulses which are given to the field memories 13A and 13B. FIG. 4A shows the vertical sync pulse VD. FIG. 4B shows the write pulse WP1 which is given to the field memory 13A. FIG. 4C shows the read pulse RP1 which is given to the field memory 13A. FIG. 4D shows the write pulse WP2 which is given to the field memory 13B. FIG. 4E shows the read pulse RP2 which is given to the field memory 13B.

As shown in FIGS. 4B and 4D, the write pulses WP1 and WP2 are given to the field memories 13A and 13B at the same timings as those for the vertical transfer pulses VT1 and VT2 (FIGS. 3D and 3G) which are given to the CCD image pickup devices 3A and 3B in the multiplex exposing mode. As shown in FIGS. 4C and 4E, the read pulses RP1 and RP2 are given at the timings synchronized with the vertical sync pulse (FIG. 4A).

Output signals of the field memories 13A and 13B are supplied to the signal processing circuit 15 through the switching circuits 10 and 11, respectively. An output signal of the AGC circuit 5C is also supplied to the signal processing circuit 15. Image pickup signals of the CCD image pickup devices 3A to 3C of different exposure timings are multiplexed.

As shown in FIG. 5, when a picture plane including a moving object 21 is multiplex-exposed by the video camera to which the present invention is applied, the portion of the moving object 21 is trebly multiplex-exposed as shown in FIG. 6. A moving object 21A is displayed in, for instance, red (R). A moving object 21B is displayed in, for example, green (G). A moving object 21C is displayed in, for example, blue (B).

According to the present invention, in the multiplex exposing mode, for instance, the exposure timings of the three CCD image pickup devices 3A to 3C are deviated and the image pickup signals which are obtained from the three CCD image pickup devices 3A to 3C are multiplexed. Due to this, the image information is obtained every field when the multiplex exposure is performed. There is no need to execute the interpolating process.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A video camera comprising:
   a plurality of image pickup devices which can simultaneously receive an object image light;
   timing setting means for setting an individual exposure timing for each of said plurality of image pickup devices;
   a signal processing circuit to form a multiplexed exposure signal from output signals of said plurality of image pickup devices;
   multiplex exposure photographing mode setting means for setting said individual exposure timings of said plurality of image pickup devices to be different from each other and for synchronizing said output signals of said plurality of image pickup devices with each other; and
   a multiplexed exposure signal formed by synthesizing said output signals without interpolating said output signals.

2. A video camera according to claim 1, wherein each of said plurality of image pickup devices exposes one of three primary colors.

3. A video camera according to claim 1, wherein said plurality of image pickup devices are CCD image pickup devices.

4. A video camera according to claim 1, wherein said signal processing circuit includes a plurality of memories for storing said output signals of said plurality of image pickup devices which are exposed at the different individual exposure timings and for synchronizing said output signals with each other.

5. A video camera according to claim 4, wherein a write signal synchronized with said individual exposure timing of each of the image pickup devices and a read signal synchronized with a vertical sync signal are given to each of said memories.

* * * * *